United States Patent [19]

Gades et al.

[11] Patent Number: 5,734,128
[45] Date of Patent: Mar. 31, 1998

[54] WEIGHING CRATE FOR LIVESTOCK

[75] Inventors: Blair R. Gades; Jerry W. Gades, both of Alexandria, Minn.; Gary R. Walters, Huntington, Tex.; Randy P. Stevens, Sherman, Tex.; Kent P. Savage, Sugarland, Tex.; Randall G. Elley, San Antonio, Tex.; Randy J. Silver, Glenwood, Minn.

[73] Assignees: BBBB's Distributing, Inc., Glenwood, Minn.; Tru-Test, Inc, San Antonio, Tex.

[21] Appl. No.: 255,174

[22] Filed: Jun. 7, 1994

[51] Int. Cl.$^6$ .................. G01G 21/28; G01G 19/00; G01G 19/52
[52] U.S. Cl. .................. 177/244; 177/147; 177/132; 177/245
[58] Field of Search .................. 177/126, 129, 177/130, 131, 148, 149, 151, 238, 244, 253, 262, 263, 132, 145, 147

[56] References Cited

U.S. PATENT DOCUMENTS

| 433,516 | 8/1890 | Charles et al. | 177/126 |
|---|---|---|---|
| 3,038,549 | 6/1962 | Thompson | 177/132 |
| 3,074,497 | 1/1963 | Hawbaker | 177/126 |
| 4,138,968 | 2/1979 | Ostermann | 177/145 |
| 4,427,083 | 1/1984 | Muddle | 177/132 |
| 4,470,471 | 9/1984 | Mills | 177/132 |
| 4,850,441 | 7/1989 | Mosdal | 177/147 X |
| 4,984,644 | 1/1991 | Skibinski | 177/132 |

*Primary Examiner*—Michael L. Gellner
*Assistant Examiner*—Randy W. Gibson
*Attorney, Agent, or Firm*—Moore & Hansen

[57] ABSTRACT

The present invention provides a single animal weighing apparatus having an external frame supporting by means of a support structure a longitudinally extending load bar and a floating weight crate suspended from the load bar and isolated from the external frame. The support structure of the present invention further enables the use of an auxiliary basket to weigh small animals, the basket being attached to the support structure above the external frame. The present invention further has a pair of gates each having two panels that are each hinged to the external frame and each including a scissors mechanism that is used to open the gate. The gate opening mechanism of each gate is manipulable from either end of the weighing apparatus. To facilitate movement of a weighing apparatus according to the present invention there is a truck provided that is equally attachable to either end of the apparatus.

16 Claims, 7 Drawing Sheets

5,734,128

WEIGHING CRATE FOR LIVESTOCK

FIELD OF THE INVENTION

The present invention relates generally to apparatus useful in determining the weight of an object or a live animal and in particular relates to an improved, portable apparatus for weighing livestock such as hogs, cattle, or sheep during all phases of their growth cycle.

BACKGROUND OF THE PRESENT INVENTION

Livestock weights are of keen interest to farmers. Proper growth management of his livestock requires that a farmer know the weights of the livestock at various times in their lives. For example, the decision of when to wean a piglet from its mother can be made by the farmer on the basis of age, weight, insight or some combination of all three. Typically, however, the primary consideration is the weight of the piglet since weaning on that basis allows piglets of nearly equivalent weights to be placed in the same pens for further growing. Decisions to change the feed or supplement fed to the livestock are also made by the farmer on the basis of weight. Marketing considerations are also heavily weight dependent. Hogs, for example, must generally have an average weight within a certain range when sold for slaughter. If the average weight should exceed the maximum of the weight range, then the price the farmer receives for the hogs will be reduced by a specified amount. This reduction is known in the industry as sort loss and some surveys indicate that some pork producers are unable to guess the weight of a market ready hog within ten to fifteen pounds. This price reduction is alone costly enough, yet it does not include the full loss suffered by the farmer under these circumstances. Other losses include the feed that the farmer put into the animals to get them over the maximum average weight.

Because of these considerations as well as others too numerous to mention here, the livestock industry has developed and marketed various brands of scales, both portable and fixtured. The known types of scales, particularly those of a portable nature, suffer from several known deficiencies. Among these are that they are too wide to be used in the often times narrow alleyways found in livestock, particularly hog, barns. These alleyways are usually only twenty four inches wide and sometimes are even narrower. The width of the known portable weighing units, particularly those using load bars which are available with a minimum twenty four inch length, thus prevents their ready use in various parts of many facilities. Further width problems are presented by the wheeled dollies or trucks used to move the units from location to location. Typically, the wheels used to move the units are themselves located outside of the frames, thereby further contributing to the problem of too great a width. Additionally, these units lack stability such that animal movements can cause the scale readings to fluctuate. More importantly, many of these units have a weighing apparatus that is sensitive to weight on the outside frame. Thus, leaning on the unit could cause an error in the weight reading. The portability of these known weight units is limited by the need to manipulate them from one end only. Finally, in spite of the economic losses suffered by the livestock producer the presently available scales are too costly for them to purchase, in part because of the need for the dual load bars for sensing the weight of the animals.

It would be desirable to have a portable weighing apparatus capable of weighing single animals, both adult and infant, with a high degree of accuracy and with great rapidity, and that was lightweight, readily portable, capable of being manipulated from either end, less costly, and that was narrower and thus able to be easily maneuvered within the narrow confines of hog confinement or farrowing buildings.

SUMMARY OF THE INVENTION

It is an object of the present invention to provide new and improved apparatus that is not subject to the foregoing disadvantages.

It is another object of the present invention to provide an improved animal weighing apparatus that isolates the weight sensor from the external frame.

It is still another object of the present invention to provide an animal weighing apparatus that was lighter and more portable than presently available weighing apparatus.

It is yet another object of the present invention to provide a portable weighing apparatus and truck that is attachable to either end of the apparatus to facilitate transportation of the apparatus from one location to another.

It is still yet another object of the present invention to provide a weighing apparatus having gates at each end thereof that are equally manipulable by the operator from either end.

It is another object of the present invention to provide a portable weighing apparatus that is narrower and lighter than presently available apparatus.

It is still another object of the present invention to provide a portable weighing apparatus that is less costly to the livestock producer than currently available weight crates.

The foregoing objects of the present invention are provided by a single animal weighing apparatus having an external frame supporting a longitudinally extending load bar and a floating weight crate suspended from the load bar and isolated from the external frame. Longitudinal placement of the load bar in the support structure provided by the present invention enables the invention to be manufactured to a narrower width than presently available weight crates using load bars. The support structure of the present invention further enables the use of an auxiliary basket to weigh small animals, the basket being attached to the support structure above the external frame. The present invention further has a pair of gates each having two panels that together are substantially the width of the weighing apparatus. The gates are each hinged to the external frame and each includes a scissors mechanism that is used to open the gate. The gate opening mechanism of each gate is manipulable from either end of the weighing apparatus.

To facilitate movement of a weighing apparatus according to the present invention there is a truck provided that is equally attachable to either end of the apparatus. The external frame thereof has a pair of handles attached at each end which may be gripped by the operator during transportation operations. The truck includes a pair of wheels mounted to a hub that is attached to an elongate rod that includes a hook. The gates each include a bracket that receives the hook when the truck is mounted thereto. The hub further includes a hub hook that engages a bracket attached to the bottom end rail of the external frame.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
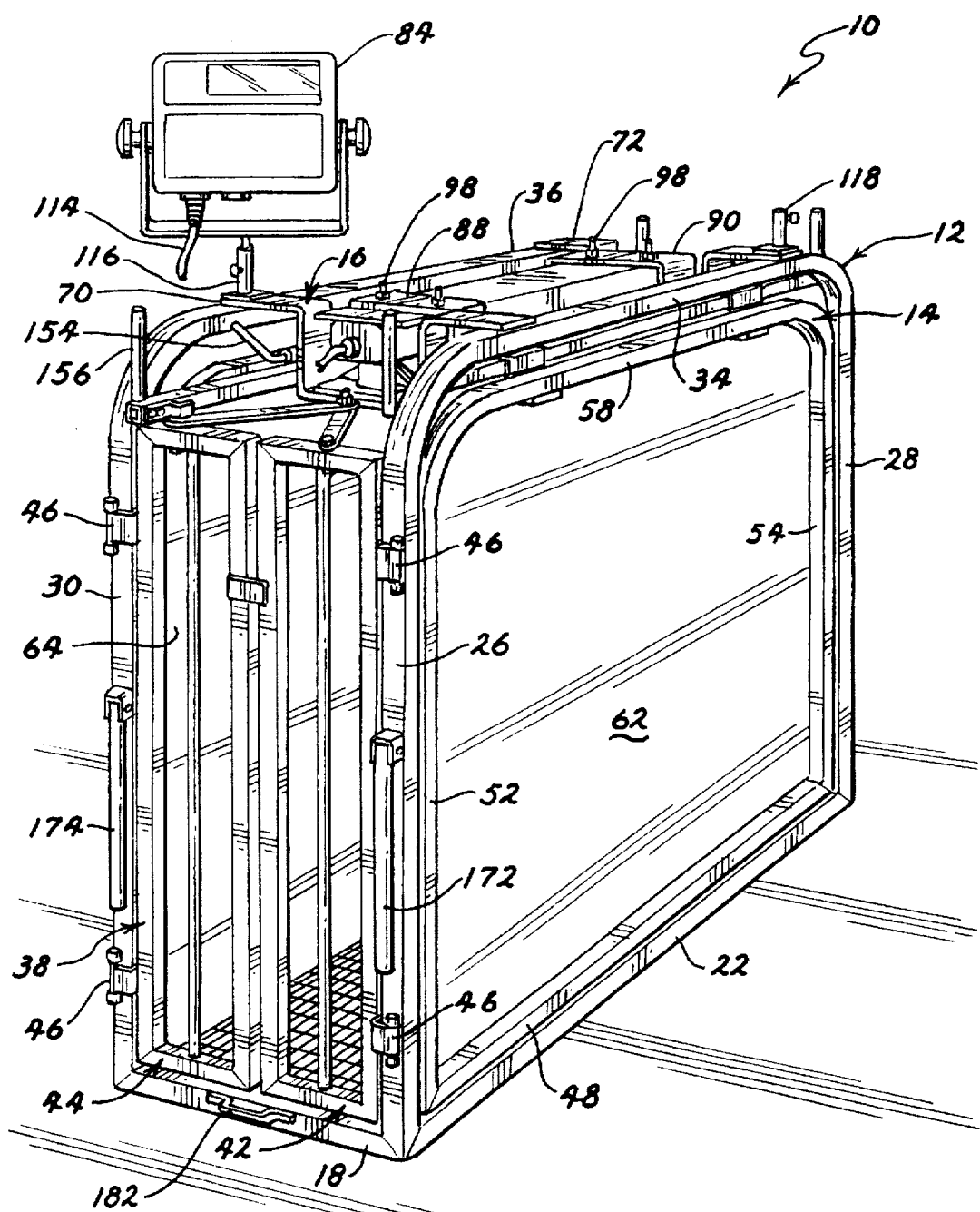
FIG. 1 illustrates the present invention in a perspective view.

FIG. 1 shows the present invention in a perspective view. It will be appreciated that the present invention as described is substantially symmetrical front to rear and left to right and as such that references to "front", "rear", "left" and "right" are made with respect to the view shown in FIG. 1. Thus, a weighing apparatus 10 in accord with the present invention includes an external frame 12, having a substantially rectangular cross section and supporting an inner floating weight crate 14, also having a substantially rectangular cross section, by means of a framework or support structure 16. The external frame 12 includes bottom front and rear end rails 18 and 20 (FIG. 5), respectively; bottom right and left side rails 22 and 24 (FIG. 5), respectively; right front and rear upright rails 26 and 28, respectively; left front and rear upright rails 30 and 32 (FIG. 5); and right and left top rails 34 and 36. The rails as shown are manufactured from square tube steel and welded together or otherwise attached in any known manner. If desired, right rails 26, 28, and 34 may comprise a single length of tubing bent into the U-shape as shown in the Figure and then welded or otherwise attached to bottom right rail 22 and bottom front and rear rails 18 and 20. The left side of the external frame may be similarly constructed if so desired.

The external frame 12 also includes front and rear gates 38 and 40 (FIG. 5) mounted thereto. Each gate includes right and left gate panels 42 and 44 that are hingedly attached to the right and left sides of the external frame 12 by means of hinges 46 (the hinges being shown in phantom outline in FIG. 5 for rear gate 40). The panels 42 and 44 each span approximately one half of the width of the floating crate 14 as shown, though if desired they may be of differing widths. The external frame 12 further supports a pair of gate opening mechanisms that may be used to open each gate from either the front or rear end of the weighing apparatus 10. This mechanism will be further described below.

Figure 5:
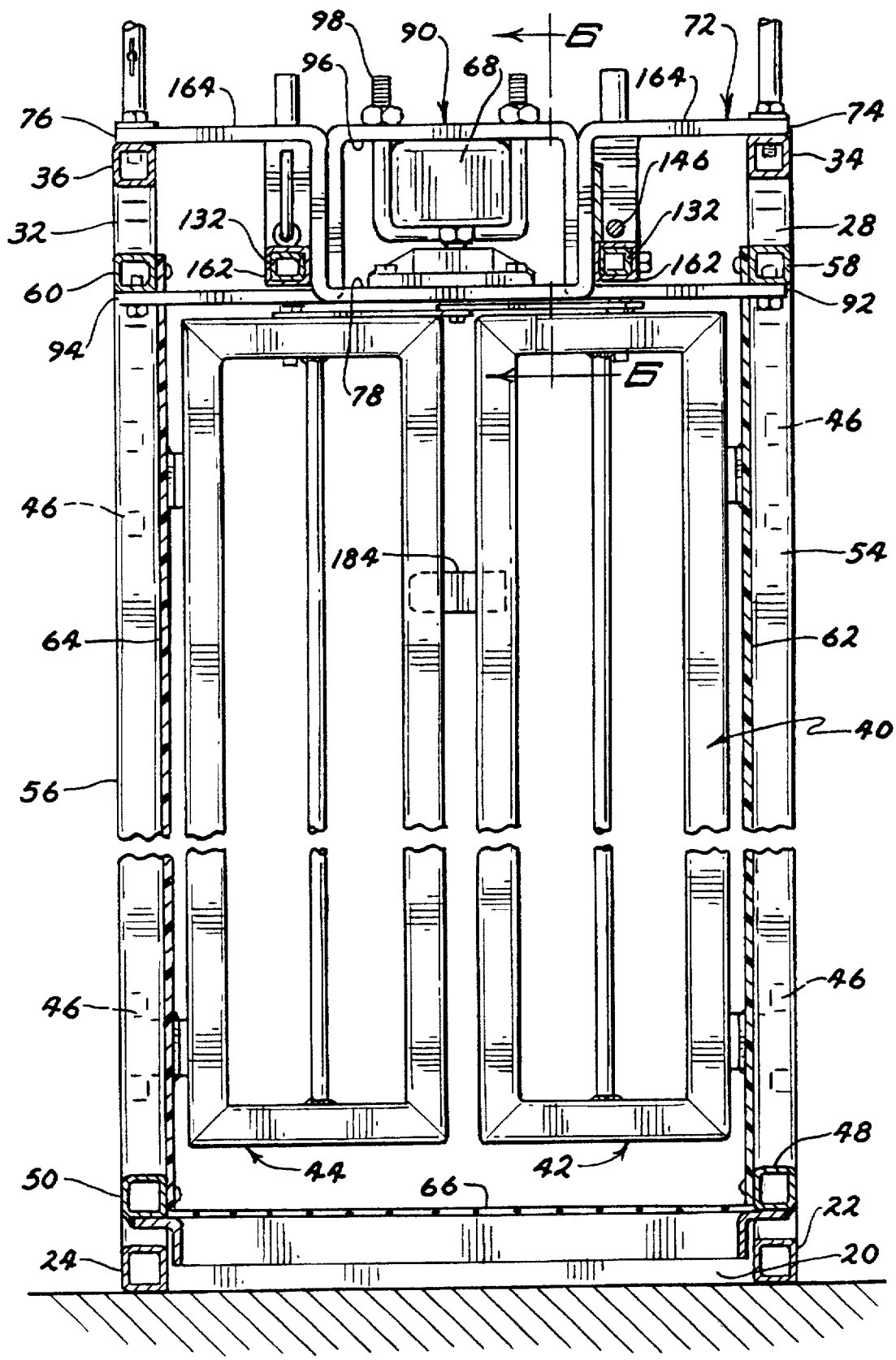
FIG. 5 shows the present invention in a cross sectional view taken along cutting plane 5—5 of FIG. 2.

Internal, floating weight crate 14 desirably has a similar structure to that of external crate 12. Thus, crate 14 also includes bottom right and left side crate rails 48 and 50 (FIG. 5), respectively; right front and rear upright crate rails 52 and 54, respectively; a left front upright crate rail (not shown) and a left rear upright crate rail 56 (FIG. 5); and right and left top crate rails 58 and 60. The internal crate rails as shown are manufactured from square tube steel and welded together or otherwise attached in any known manner. If desired, right rails 52, 54, and 58 may comprise a single length of tubing bent into the U-shape as shown in the Figure and then welded or otherwise attached to bottom right crate rail 48. The left side of the external frame may be similarly constructed if so desired. Internal, floating weight crate 14 also includes right and left crate side panels 62, 64 (FIG. 5). The crate side panels 62 and 64 may be formed from a synthetic material, such as a thermoplastic resin, and fastened to the crate rails as shown in FIG. 5 using known fasteners such as bolt/nut combinations. The crate 14 further includes a wire mesh flooring 66 of known type and construction attached to the crate rails to provide a floor for an animal to stand on during weighing operations.

Apparatus 10 further includes a framework or support structure 16 to support the weighing mechanism, which comprises a load bar 68, and the internal, floating weight crate 14. It should be noted that the support structure supports the internal crate 14 within or in line with the external frame 12, thereby contributing to keeping to the narrow overall width of the unit. That is, the width of the external frame and the crate are substantially the same. Referring now to FIGS. 1, 4, 5 and 6, the support structure 16 will be described. The support structure 16 includes front and rear load bar support straps 70 and 72. The support straps 70 and 72 each include right and left ends 74 and 76 that are fastened in a known manner, such as by welding or bolting, to the top external right and left frame rails 34 and 36, respectively. Each support strap 70, 72 includes a recess 78 into which load bar 68 is disposed. Thus, as shown in the Figures and as best seen in FIG. 5, support straps 70 and 72 each have a substantially U-shaped configuration.

Figure 6:
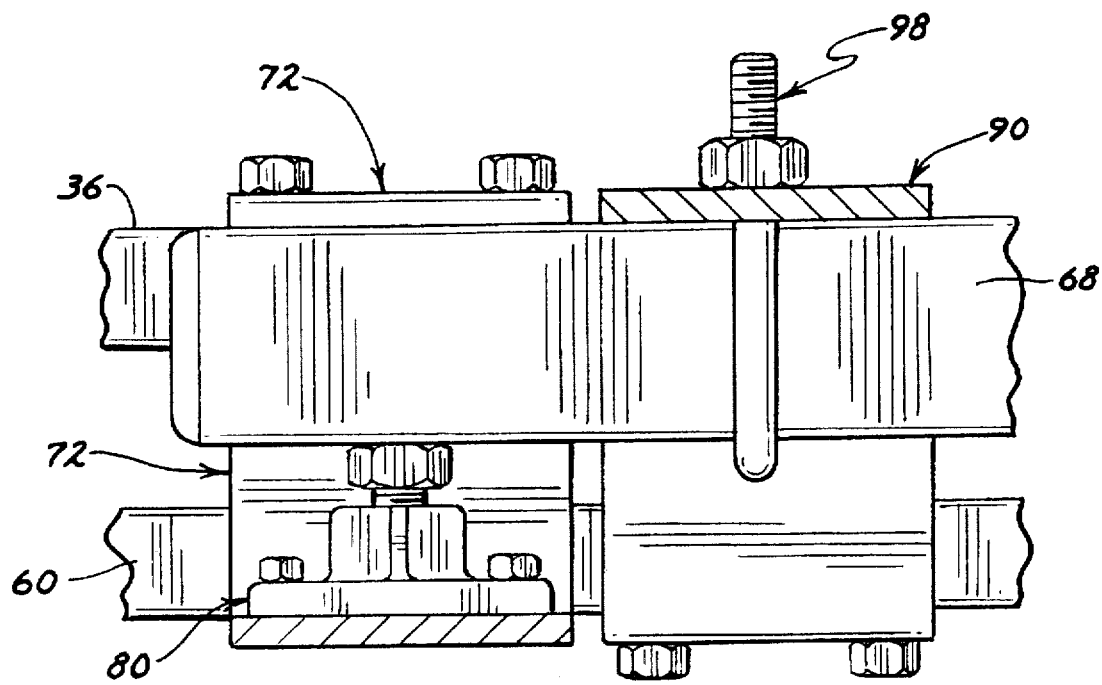
FIG. 6 shows the support structure used to isolate the weight crate from the external frame and is a cross sectional view of the present invention taken along cutting plane 6—6 of FIG. 5.

As best seen in FIG. 6, load bar 68 includes a mounting unit 80 which is welded, bolted, or otherwise attached to the straps 70, 72 within recess 78 in any known manner. The load bar 68 is thus disposed longitudinally and substantially parallel to the longitudinal axis 82 (FIG. 4) of the present invention 10. Known weighing crates that utilize load bars typically include two such units extending transversely of the longitudinal axis, that is, they extend between the sides of the units at the front and the rear thereof. Consequently, the units must be made wider than the present invention, which inhibits their use in hog confinement houses. Furthermore, the use of multiple load bars requires additional time for the control unit used therewith, such as the control unit 84 shown in the Figures, to calculate an accurate weight for the animal being weighed due to the need to consider the inputs from the multiple load bars. Control unit 84 may be of the type manufactured by Tru-Test, Inc., of San Antonio, Tex. and further information is readily available from them as to the operation of such a unit. Typically, however, such control units contain a microprocessor or other calculation means to process the data received from the load bar 68 and a display area to display the calculated weight. It may also include a keyboard to input data, such as identifying indicia for the animal being weighed. Thus, the present invention, due to the single load bar and its longitudinal disposition provides for a more rapid weighing of the animals and contributes to a more efficient livestock operation. Furthermore, the use of the single load bar reduces the overall cost of the unit since multiple load bars do not need to be purchased.

Load bar 68 may be of the type manufactured by Tru-Test, Inc., of San Antonio, Tex., detailed information relating to which can be obtained directly from the manufacturer. For the purposes of the description of the present invention, it suffices to note that the load bar includes stress cells and operates by measuring the weight placed on the side opposite of the mounting unit 80, that is, the force directed downwardly thereon. Thus, in the configuration shown for the present invention, the load bar measures the weight placed upon the upper surface 86 thereof. As such, since the load bar 68 is attached to the external frame 12 by the straps 70, 72 only by the bottom of the load bar, the external frame 12 is isolated from the load bar 68 and any weight placed thereon by the operator or anyone or anything else will not affect the weight measurements.

Figure 2:
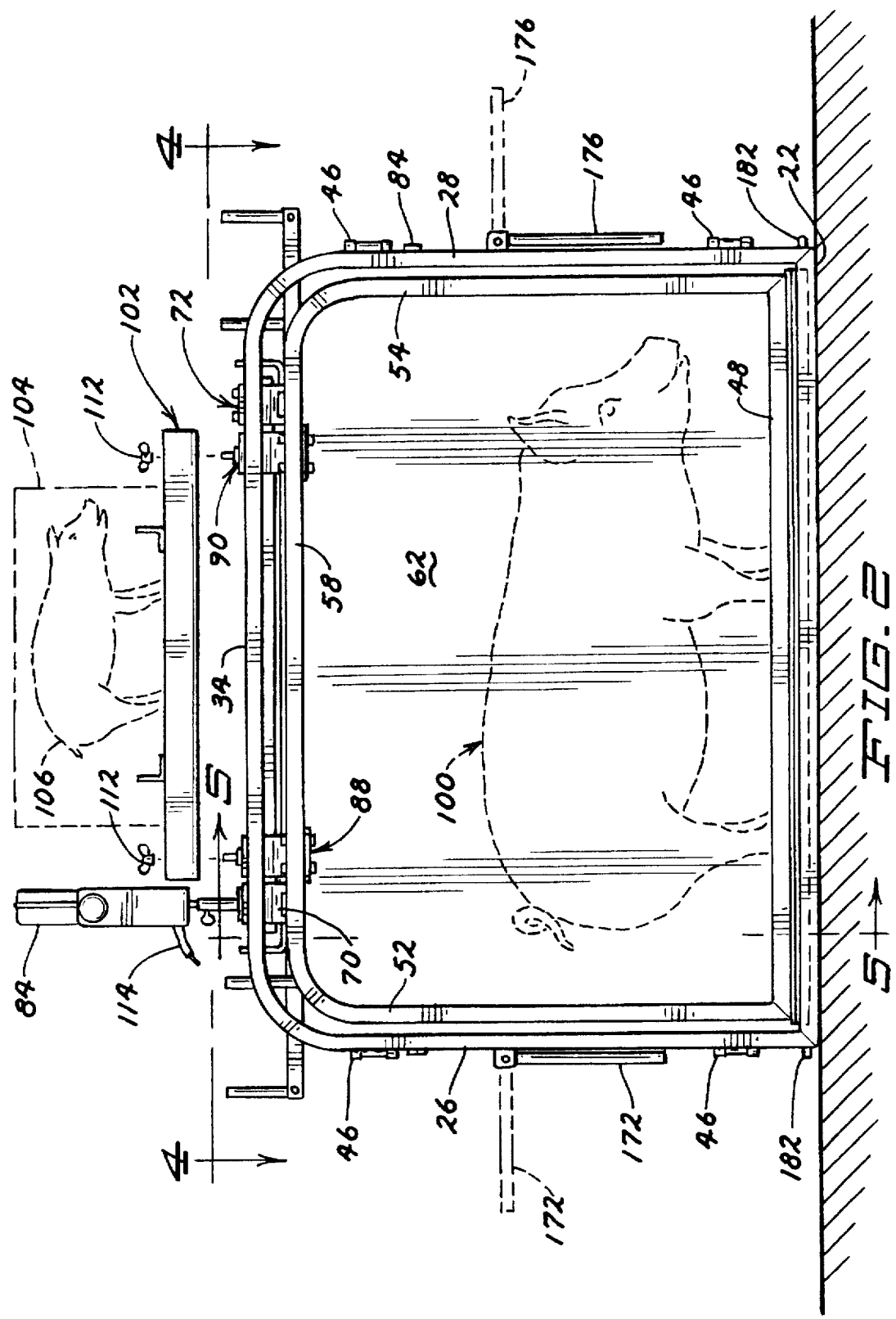
FIG. 2 shows the present invention in a side elevation view and illustrates in phantom outline the positions of a hog and piglet during weighing operations, the latter being shown in phantom outline in a basket mountable to the brackets suspending the weight crate from the load bar.

The present invention 10 further includes a suspension structure that is used to suspend the floating weight crate 14 from the load bar 68. The suspension structure includes front and rear crate support brackets 88 and 90. Each crate support bracket 88 and 90 includes right and left ends 92 and 94, respectively, that are attached to right and left top crate rails 58 and 60, respectively, by known means such as welding or bolting. Each crate support bracket 88 and 90 further includes a recess 96 and has a configuration that is substantially U-shaped. Preferably, crate support brackets 88 and 90 are configured substantially similar to load bar support straps 70 and 72, thereby simplifying manufacturing of the present invention. Known means, such as a pair of U-shaped bolts 98 is used to removably attach the weight crate 14 to the load bar 68, as best seen in FIG. 5. Thus, crate support brackets 88 and 90 each include a pair of through holes through which the threaded portions of bolts 98 are inserted, with the load bar 68 being disposed between the horizontal portion of bolt 98 and the lower surface of the recess 96. In this manner then, the floating weight crate 14 is suspended from the top, weight measuring surface 86 of the load bar 68. The weight crate is completely isolated from the external frame 12 such that a loads placed thereon will not affect the measurement of the animal held within weight crate 14. When an animal enters the weight crate through either gate 38 or 40, only the combined weight of the crate and support brackets, which is accounted for by the control panel 84, and the animal, such as the hog 100 shown in FIG. 2, is measured. With the control panel 84 accounting for the weight of the crate and the supporting brackets, the display of the control panel will show only the weight of the animal within the crate 14. The single, longitudinally extending load bar 68 provides a more rapid readout of the weight of the crated animal since only the readings from a single data source need to be considered in determining the weight.

Figure 3:
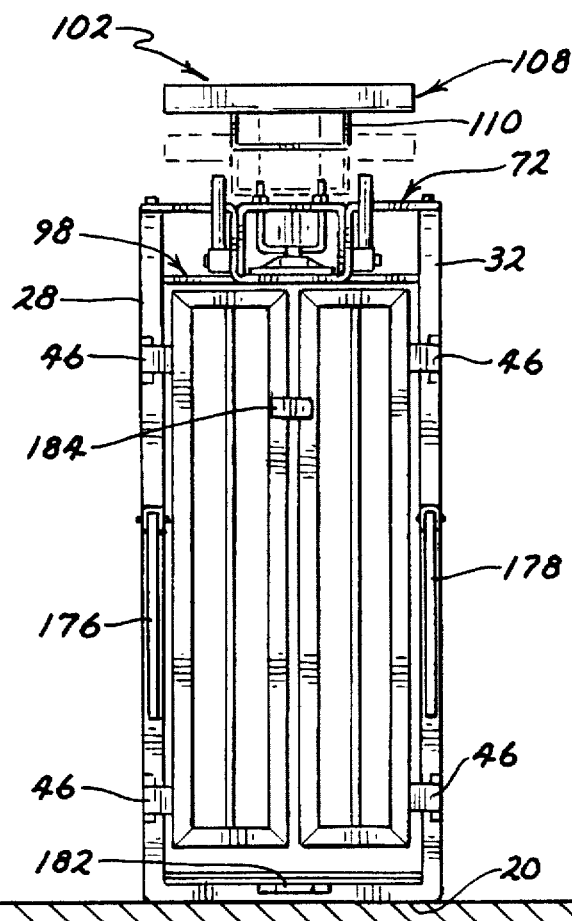
FIG. 3 depicts the present invention from an end elevation view looking from the rear of the present invention to the front thereof and shows the auxiliary support used to hold the auxiliary basket for weighing small animals.

A further advantageous feature of the present invention is the ability to rapidly and precisely weigh smaller animals. The present invention thus includes rack 102 that can be used to position a basket or other enclosure 104, shown in phantom outline, holding a small or baby animal such as the piglet 106 shown in FIG. 2 on the top of the load bar 68. As seen in FIGS. 2 and 3, rack 102 may include a basin 108 having upturned sides and a pair of U-shaped mounts 110 including through holes that receive the threaded ends of bolts 98. The bolts 98 can be sized to have a length to extend through appropriately configured holes in basin 108 and affixed thereon with wing nuts 112 as shown in FIG. 1. Because the load bar measures weight bearing on the upper surface 86 thereof, the load bar is able to sense the weight of the animal held within enclosure 104 since its weight is transmitted downwardly through the rack 102 to the front and rear crate support brackets 88 and 90, respectively.

The load bar 68 is operatively connected to control panel 84 by means of appropriate connection means 114. The present invention further includes appropriate front and rear mounting posts 116, 118 disposed at both the front and rear thereof to facilitate the use of the weighing apparatus in any orientation regardless of the direction the apparatus 10 is placed. The mounting posts 116, 118 are attached to the load bar support straps 70, 72 respectively.

Figure 4:
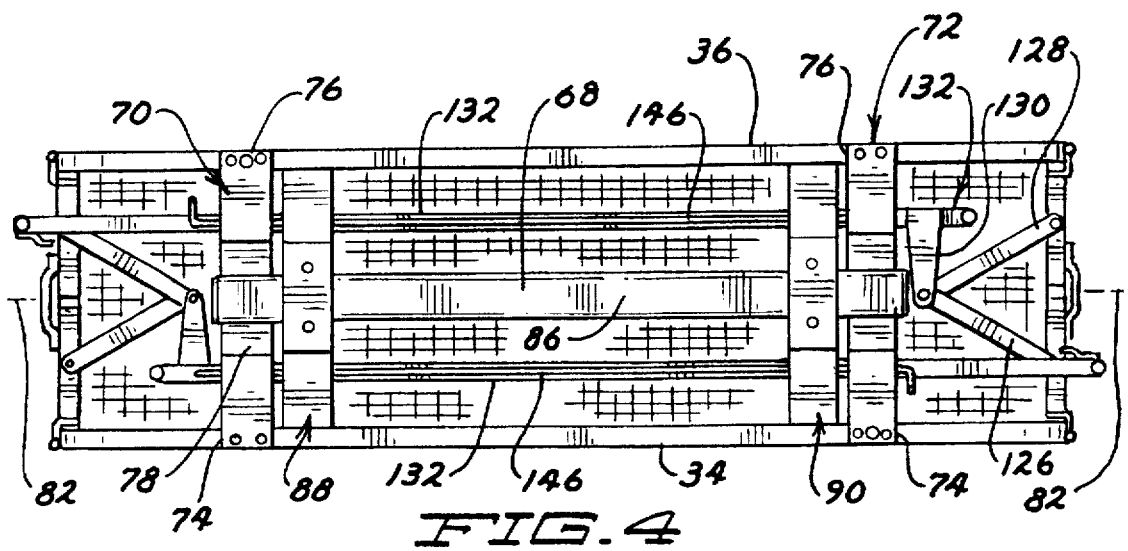
FIG. 4 illustrates the present invention in a top elevation view taken along viewing plane 4—4 of FIG. 2.
Figure 8:
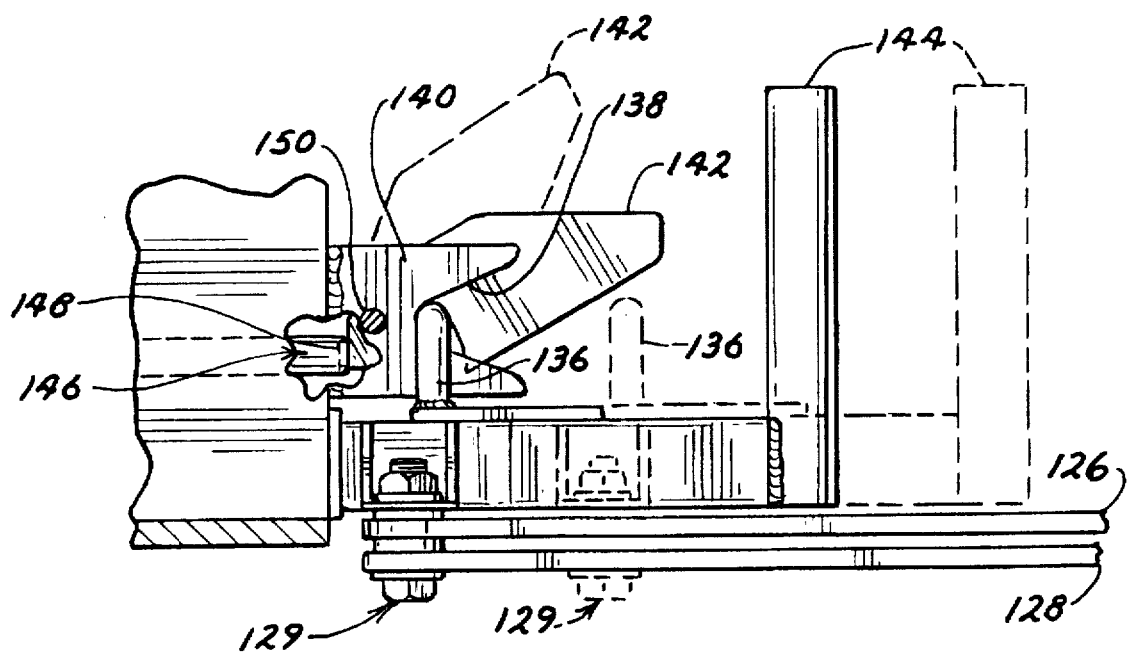
FIG. 8 is a cross sectional view of the gate opening mechanism of the present invention taken along cutting plane 8—8 of FIG. 7.
Figure 7:
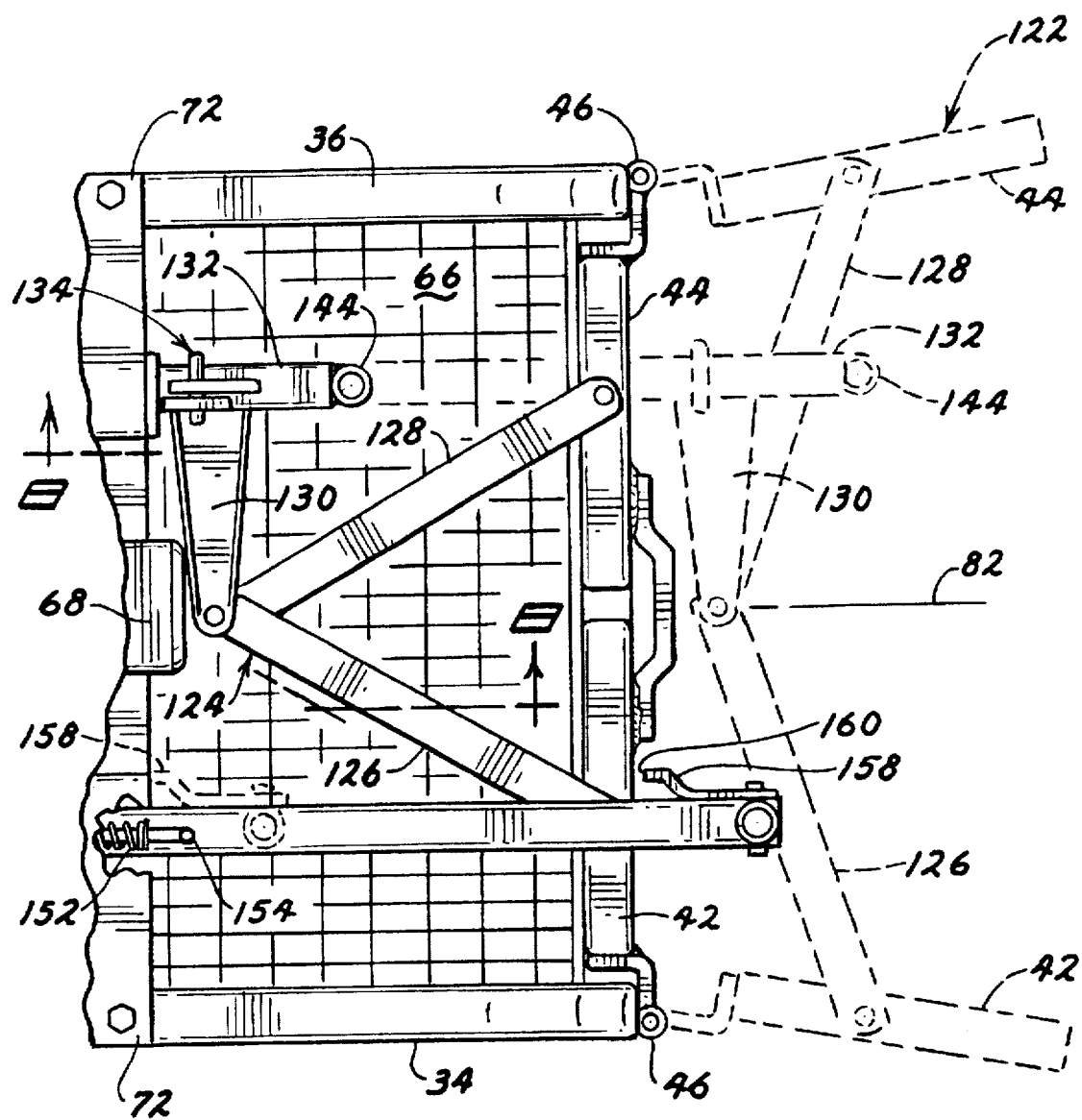
FIG. 7 is a partial overhead view of the present invention and shows the gate opening mechanism of the present invention.

Referring now to FIGS. 4, 7, and 8 principally, the mechanisms used to open and close gates 38 and 40 will be described. It will be understood once again that due to the similarity of the mechanisms used to open and close the gates 38 and 40 that a description of the apparatus used to open and close one of the gates 38, 40 will suffice to describe the other gate. Referring specifically to FIG. 7, rear gate 40 is shown in a closed position 120 and in an open position 122 in phantom outline. A scissors mechanism 124 comprising right and left bars 126 and 128 is used to facilitate opening and closing of the gates. Each of bars 126, 128, is pivotally attached at one end to a gate panel 42 and 44 respectively. The other ends of the bars 126, 128 are pivotally attached to each other by means of a fastener such as a nut/bolt combinations 129 substantially along the longitudinally extending centerline of the apparatus 10 so as to form a V-shaped configuration. The scissors mechanism 124 further includes a connecting plate 130 that extends from a fixed attachment to the pivotally connected bars 126, 128 substantially transversely to longitudinally extending axis 82 to a fixed engagement with a longitudinally extending gate bar 132. Gate bar 132 extends substantially the entire length of the apparatus 10 substantially parallel to the longitudinal axis 82. A latching mechanism 134 to be described hereafter latches the gate bar 132 into a latched position. When the latching mechanism 134 is released, the gate bar 132 may be pulled longitudinally in the direction of the opening gate to move the gate from the closed position 120 to the open position 122.

Referring now to FIG. 8, the latching mechanism will be described. As seen in the Figure, the gate bar 132 includes a hook 136, normally biased under the influence of gravity to a closed gate position, that is received within a v-shaped groove 138 of a hook receiver 140. A latch lever 142 is pivotally attached to the hook receiver 140. When the gate is in the closed position 120 as shown in FIG. 7, the latch lever 142 captures the hook 136 within the groove 138 of hook receiver 140, thereby preventing the gate bar 132 from being moved longitudinally. To open gate 40, the operator lifts latch lever 142 to the position shown in FIG. 8, thereby freeing hook 136, and pulls on the gate handle 144 attached to the end of gate bar 132.

To open the rear gate 40 from the front end of the apparatus 10, the unlatching mechanism further includes a latch lever arm 146 that extends substantially the length of the gate bar 132 therealong as best seen in FIG. 4. The gate bar 132 can be supported along its length in any known manner, such as appropriately configured loops attached to the load bar support straps 70 and 72. The rear end 148 of the latch lever arm 146 engages the latch lever 142 below its pivot point 150, here shown as a shaft used to pivotally attach the latch lever 142 to the hook receiver 140. Latch lever arm 146 is biased by a biasing means such as a spring 152 into a position where the latch lever 142 can rest in its closed position. The front end of the latch lever arm 146 includes a handle 154 or some other gripping means while the front end of the gate bar 132 includes an upright handle 156 or some other gripping means. To open the rear gate 40 from the front end of the apparatus 10, then, the operator would push rearwardly on handle 154 of latch lever arm 146, thereby compressing spring 152 and forcing the rear end 148 of the latch lever arm 146 against the latch lever 142. The engagement of the latch lever arm 146 with the latch lever 142 forces the latch lever 142 to pivot about its pivot point 150 between the closed or latched position shown in FIG. 8 and the open or unlatched position shown in phantom outline in the Figure. The operator can then push front upright handle 156 of rear gate 42 rearwardly, thereby pushing gate bar 132 rearwardly and pushing the rear gate open from its closed position 120 to its open position 122. To close the gate, the operator pulls forwardly on the handle 156, reversing the aforementioned movements.

The foregoing description set forth the apparatus used to open and closed rear gate 40. As previously noted, a similar apparatus is used to open and close the front gate 38, but this apparatus is attached in a reverse manner to that of the previously described structure. With the foregoing apparatus attached to both front and rear gates 38 and 40, then, each gate is equally and easily opened and closed from both the front and the rear of the weighing apparatus 10, thereby allowing the present invention to be placed in any orientation within an alleyway without regard to the ability to open and close the gates. To prevent the gates from being opened too far, the gate bars may include a stop 158 that engages the framework or support structure 16, as best seen in FIG. 7. Stop 158 as shown comprises a member having an end 160 that engages the load bar support strap 72. It will be further noted in FIGS. 5 and 7 that the gate bars 132 are disposed so as to be closely adjacent to the exterior sides of the recess 78 for the load bar 68. As shown, the gate bars 132 extend through loops 162 that are welded or otherwise affixed in known manner to the strap 72. Similar loops will be attached to the other support strap 70 to thereby provide support to the gate bars and to the latch lever arm 146. The mechanisms used to open the gates from the opposing end of the apparatus 10 thus extend longitudinally along the apparatus on the outer sides of the recess 78 for the load bar 68. If desired, the support means or loops 162 could have been fastened to the horizontal portion 164 of the support straps 70, 72. Thus, the apparatus includes support straps 70, 72 wherein the support straps each have substantially planar outer portions 164 and a recess 78 having a U-shaped configuration with the gate bar 132 and the latch lever arm 146 being supported on the outside of the recess 78. As previously noted, the crate brackets 88 and 90 are substantially similar to the support straps 70, 72.

Figure 9:
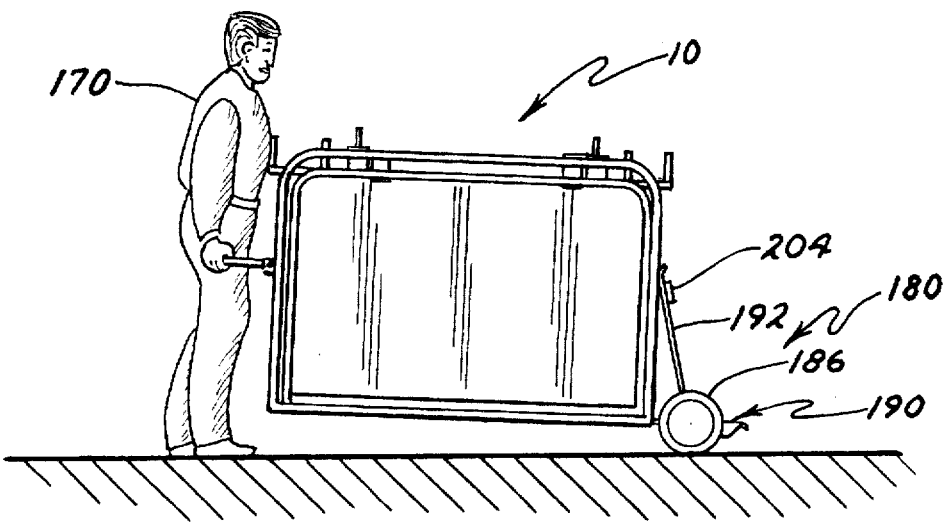
FIG. 9 is a side elevation view showing the present invention in the transport position with the truck attached thereto.
Figure 12:
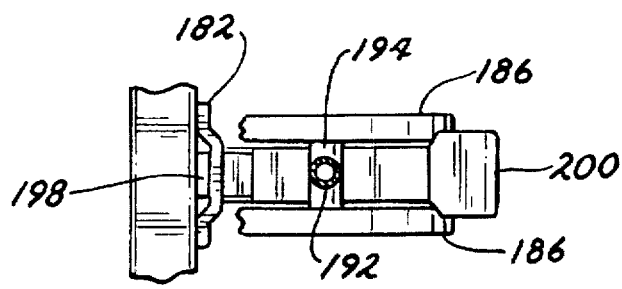
FIG. 12 is an overhead view of the truck and weighing apparatus taken along viewing plane 12—12 of FIG. 10.

Referring now to FIGS. 9-12, the portable nature of the present invention will be described. Referring first to FIG. 9, the drawing shows a weighing apparatus such as the apparatus 10 in accord with the present invention being transported by an individual 170. The individual 170 is grasping right and left transport handles 172 and 174, which are best seen in FIG. 1 and which are pivotally attached to the right and left upright external frame rails 26 and 30, respectively. A similar pair of transport handles 176 and 178 are shown attached to the rear end of the weighing apparatus 10 in FIG. 3, but are omitted for purposes of clarity in FIG. 9. The transport apparatus further includes a truck 180 attached to the apparatus 10 in a manner to be described. Thus, as best seen in FIGS. 1 and 3, each end of the apparatus 10 includes a lower bracket 182 attached to bottom rear end rail 20 and an upper bracket 184 attached to right panel 42 of the rear gate 40, though it could as well be attached to the left panel 44 instead. Truck 180 includes means to engage both lower and upper brackets 182 and 184. Truck 180 includes a pair of rollers 186 (FIG. 12), which may be wheeled tires, mounted for rotation by an axle 188 relative to a jack 190. Truck 180 further includes an elongate brace rod 192 attached at one end to a U-bracket 194 that is rotationally attached to axle 188. Brace rod 192 has a forked upper end 196 configured to engage upper bracket 184. Jack 190 has a hook 198 configured to engage the lower bracket 182 and a foot pad 200.

Figure 10:
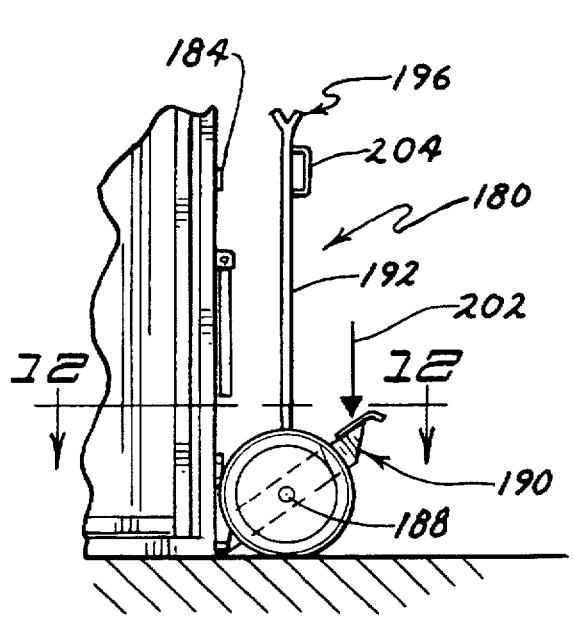
FIG. 10 is a partial side elevation of the present invention showing the truck in the first stage of attachment to the weighing apparatus.
Figure 11:
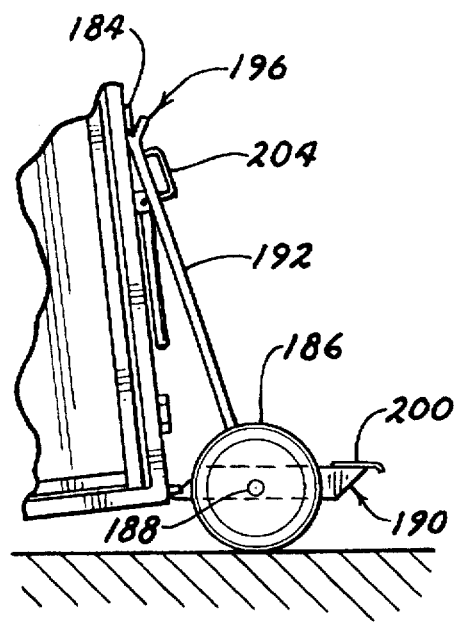
FIG. 11 is a partial side elevation view of the present invention showing the truck attached to the weighing apparatus.

The various components of truck 180 having been explained in brief detail, its use with the present invention can now be explained. Referring to FIG. 10, the operator will move the truck 180 to a location near the preferred end of attachment to the weighing apparatus 10. Hook 198 will be engaged with lower bracket 182 in the manner shown in the Figure. The operator will then exert a downward force as indicated by arrow 202 on foot pad 200, causing the opposite end of the jack 190, which is hook 198, to be elevated as it pivots around its attachment to the axle 188. This motion in turn causes the apparatus 10 to be lifted as shown in FIG. 11. The operator can then rotate the brace rod 192 towards the apparatus 10 such that the forked end 196 is below the upper bracket 184. The downward pressure as indicated by arrow 202 can then be released and the apparatus 10 will lower slightly until the upper bracket 184 engages the forked end 196. In this manner the truck is removably attached to the apparatus 10 and in particular only to the external frame elements and not the internal floating crate 14. The operator can then grasp the handles, 172 and 174 or 176 and 178, lift up on them, and wheel the apparatus 10 to its desired use or storage location. Because the truck 180 is comparatively light in weight and because it can be used at either end of the apparatus 10 the truck 180 can be easily used at one end of the apparatus 10 to move it to a desired location and then moved to the other end to wheel the apparatus away to a new location.

Once at the proper location, the truck 180 can be removed from the apparatus 10 and placed out of the way for weighing operations. To do this the operator again exerts a downwardly directed force 202 on the foot pad 200, causing the end of the apparatus 10 to which the truck 180 is attached to elevate slightly. This slight elevation disengages the forked end 196 from the upper bracket 184 allowing the operator to pull the brace rod 192 rearwardly so that it is free of the possibility of engaging the upper bracket 184. The downward force 202 can then be released and the apparatus 10 can be lowered until it is on the surface. The jack hook 198 can be disengaged from the lower bracket 182 and the truck 180 moved aside for the commencement of weighing operations. A handle 204 may be attached to the brace rod 192 to facilitate its use.

It should be noted that further features of the present invention include the truck 180 having a width no greater than the width of the apparatus 10. The truck 180 thus does not inhibit the transport of the apparatus 10 to other locations as do presently available means for moving such weight crates. The longitudinal use of a single load bar enables the apparatus 10 to be made narrower than presently available weighing units, which allows it to be lighter in weight and therefore more susceptible to being easily moved by a single person between use and storage locations.

The present invention having thus been described, other modifications, alterations, or substitutions may now suggest themselves to those skilled in the art, all of which are within the spirit and scope of the present invention. For example, the construction of the external frame and the internal floating crate has been described as being of square tube steel. Any other suitable material may be used, however, to construct the frame and crate. It is therefore intended that the present invention be limited only by the scope of the attached claims below.

What is claimed is:

1. An improved weighing apparatus comprising:
    a frame;
    a load bar having a longitudinal axis;
    a framework attached to said frame and suspending said load bar from said frame, and said frame defining a longitudinal axis, with said load bar being suspended by said framework such that the longitudinal axes of said load bar and said frame are substantially parallel;
    a crate for holding an object to be weighed, said crate being suspended from said load bar within the frame;
    means for suspending said crate from the load bar comprising a pair of crate brackets spaced apart from each other, each said crate bracket defining a recess receiving said load bar, said brackets being attached to said crate and
    said frame work comprises a pair load bar support straps spaced apart from each other, each said strap defining a recess receiving and suspending said load bar, said straps being attached to said frame.

2. The apparatus of claim 1 wherein said crate is suspended within the frame in line therewith.

3. The apparatus of claim 1 wherein said crate has a substantially rectangular cross section.

4. An improved weighing apparatus comprising:
    a frame;
    a load bar;
    a framework attached to said frame and suspending said load bar from said frame;
    a crate for holding an object to be weighed, said crate being suspended from said load bar;
    said frame including first and second ends each having first and second upright spaced-apart members, and first and second gates for opening and closing said first and second ends, respectively, to allow ingress into and egress from said crate, said gates each comprising a pair of panels, each of said panels hingedly attached to an upright frame member and having together a width about substantially equal to the width of said crate such that such panels close a crate end when a gate is closed;
    said apparatus is elongated and has a longitudinal direction of extent, and said apparatus further including means for opening and closing each of said gates from either end of said apparatus, and wherein at least one of said means for opening and closing for at least one of said gates comprises:
    a gate bar, said gate bar extending substantially along the longitudinal direction of extent of said apparatus and including a handle at each end thereof for manipulation of said gate bar at either end of said apparatus, said gate bar being slidable longitudinally between gate closed and open positions;
    a scissors mechanism, said mechanism including a pair of scissors bars, each said scissors bar pivotally attached to a said panel at one end thereof and to each other at the end thereof, said mechanism further including means for connecting said mechanism to said gate bar; and
    latching means, said means comprising:
        a latch lever arm, said latch lever arm extending substantially the length of said gate bar and being slidable longitudinally between gate closed and open positions, said latch lever arm biased into a closed gate position, said latch lever arm having first and second ends, said first end including;
        a hook attached to said gate bar at an end thereof;
        a hook receiver attached to said framework; and
        a latch lever pivotally mounted to said hook receiver and provided for latching said hook to said hook receiver, said latch lever being biased to a gate closed position where said hook is latched in place and movable to a gate open position where said hook is unlatched and said gate bar is slidable to a gate open position, said latch lever being pivotally movable by engagement of said latch lever arm second end therewith, wherein an operator can open said at least one gate from the opposing end of said apparatus by moving said latch lever arm toward said gate to unlatch said latch lever and free said hook and said gate bar for movement toward said at least one gate, said scissors mechanism cooperating therewith to open said at least one gate and wherein an operator can open said at least one gate from the same end of said apparatus by manually unlatching said latch lever to free said hook and then by pulling on said gate bar.

5. The apparatus of claim 4 wherein said framework comprises a pair of load bar support straps spaced apart from each other, each said strap defining a recess receiving and suspending said load bar, said straps being attached to said frame and extending transversely to said longitudinal axes and wherein said gate bar and said latch lever arm are supported by said support straps.

6. The apparatus of claim 5 wherein said support straps each have substantially planar outer ends and said recess has a U-shaped configuration, said gate bar and said latch lever arm being supported on the outside of said recess.

7. The apparatus of claim 4 wherein said other means for opening and closing said other gate comprises:
    a second gate bar, said second gate bar extending substantially along the longitudinal length of said apparatus and including a handle at each end thereof for manipulation of said gate bar at either end of said apparatus, said second gate bar being slidable longitudinally between gate closed and open positions;
    a second scissors mechanism, said mechanism including a pair of scissors bars, each said scissors bar pivotally attached to a said panel at one end thereof and to each other at the end thereof, said mechanism further including means for connecting said mechanism to said gate bar; and
    a second latching means, said second latching means comprising:
        a latch lever arm, said latch lever arm extending substantially the length of said gate bar and being slidable longitudinally between gate closed and open positions, said latch lever arm biased into a closed gate position, said latch lever arm having first and second ends, said first end including;
        a hook attached to said gate bar at an end thereof;
        a hook receiver attached to said framework; and a latch lever pivotally mounted to said hook receiver and provided for latching said hook to said hook receiver, said latch lever being biased to a gate closed position where said hook is latched in place and movable to a gate open position where said hook is unlatched and said gate bar is slidable to a gate open position, said latch lever being pivotally movable by engagement of said latch lever arm second end therewith;

wherein an operator can open said other gate from the opposing end of said apparatus by moving said latch lever arm of said second latching means toward said other gate to unlatch said latch lever of said second latching means and free said hook of said second latching means and said second gate bar for movement toward said other gate, said second scissors mechanism cooperating therewith to open said other gate and wherein an operator can open said other gate from the same end of said apparatus by manually unlatching said latch lever of said second latching means to free said hook of said second latching means and then by pulling on said second gate bar.

8. Livestock weighing apparatus comprising:

an external frame assembly of substantially rectangular shape having a predetermined width defined by side frame members;

an internal crate for holding an animal to be weighed supported for vertical movement within the external frame assembly, said crate being of substantially rectangular shape and having side frame members defining a predetermined width which is the same as the width of the external frame; and load receiving and transmitting means positioned in interactive relation to said crate to receive the weight load of an animal inside of the crate in response to vertical displacement of the crate.

9. The weighing apparatus of claim 8 wherein:

the crate has opposed planar said walls which are fully contained within and substantially coplanar with said side frame members of the external frame assembly.

10. The weighing apparatus of claim 8 wherein:

the side frame members of the external frame assembly comprise, on each side of the external frame assembly, a pair of horizontally spaced, upright members and a pair of vertically spaced, horizontal members interconnected therewith and defining substantially rectangular side wall frames; and the crate side frame members comprise, on each side thereof, a pair of horizontally spaced, upright members of lesser height than the upright members of the external frame assembly and a pair of vertically spaced, horizontal members of lesser length than the horizontal members of the external frame assembly, and defining substantially rectangular crate side wall frames which are substantially coplanar with an contained within the side frame members of the external frame assembly.

11. Livestock weighing apparatus comprising:

a rectangular frame assembly;

a single, continuous, elongated load bar extending lengthwise of the frame assembly and having a top surface;

a framework attached to said frame assembly and suspending said load bar from said frame assembly with the load bar fixed against rotational movement; and a crate for holding an animal to be weighed, said crate being directly suspended from the top surface of the load bar, within the frame assembly.

12. The apparatus of claim 11 wherein the frame assembly includes first and second ends and first and second gates for opening and closing said first and second ends, respectively, to allow ingress into and egress from said crate and said gates each include a gate truck bracket and said external frame assembly includes a frame truck bracket, said truck brackets being substantially vertically aligned and wherein said apparatus further includes a truck for moving said apparatus, said truck comprising:

an elongate rod having first and second ends, said second end engageable with said gate truck bracket;

at least one roller rotatably mounted to said rod first end;

a jack having a foot pad and a jack hook rotatably mounted to said roller, said jack hook engageable with said frame truck bracket;

whereby said truck is attached to said apparatus for movement by:

engaging said jack hook with said frame truck bracket;

exerting a downward force on said foot pad to pivot the foot pad downwardly and the opposed jack hook upwardly, thereby elevating said apparatus;

rotating said elongate rod toward said apparatus to place said rod second end in position for engaging said gate truck bracket; and releasing the downward force on said foot pad to lower said apparatus into engagement with said gate truck bracket.

13. The apparatus of claim 12 wherein said frame includes at least one handle mounted thereto opposite said end of said crate where said truck is attached, said handle being provided for the operator to grasp and move said apparatus.

14. The apparatus of claim 12 wherein:

said truck comprises a pair of rollers mounted to an axle;

said elongate rod is mounted to a U-bracket that is rotationally mounted to said axle; and said jack has an elongate configuration with a length exceeding the diameter of said rollers, said jack being rotationally mounted to said axle.

15. An improved weighing apparatus comprising:

a frame;

a load bar having a longitudinal axis;

a framework attached to said frame and suspending said load bar from said frame, and said frame defining a longitudinal axis, with said load bar being suspended by said framework such that the longitudinal axes of said load bar and said frame are substantially parallel;

a crate for holding an object to be weighed, said crate being suspended from said load bar within the frame;

means for suspending said crate from the load bar comprising a pair of crate brackets spaced apart from each other, each said crate bracket defining a recess receiving said load bar, said brackets being attached to said crate; and further including a basket removably attached to said load bar and supported thereabove, said basket being provided for weighing small animals.

16. The apparatus of claim 15 wherein the basket is removably attached to the load bar by a rack removably attached to the upper side of said crate brackets so as to exert a downwardly directed force.

\* \* \* \* \*